Jan. 15, 1957 H. W. HARTJE 2,777,613
ADJUSTABLE COUPLING ATTACHMENT FOR SHAFTS
Filed March 1, 1955

INVENTOR.
Henry W. Hartje
BY John F. Brezina

United States Patent Office 2,777,613
Patented Jan. 15, 1957

2,777,613
ADJUSTABLE COUPLING ATTACHMENT FOR SHAFTS

Henry W. Hartje, Glasston, N. Dak.

Application March 1, 1955, Serial No. 491,357

3 Claims. (Cl. 222—268)

This invention is directed to an adjustable device for shifting and holding longitudinally slidable power transmission and seeding shafts in proper and fixed positions to which the same are manually moved and set. More particularly, it is directed to manually adjustable means for holding power-driven and slidable shafts of seeders and similar implements which are adapted to hold a plurality of feeding elements or units in different adjusted positions so as to vary and regulate the number or volume of field seeds to be expelled and fed to delivery chutes or upon distributing plates from which the seeds are dropped into furrows formed by soil-engaging disks or other similar members as the implement is pulled across fields.

In presently known field seeding implements of the type known as seed drills, and which feed and drop the seed either in furrows formed by a plurality of transversely spaced rotating disks, or scatter the same, the seed is usually placed into and carried by two transversely extending elongated bins, boxes or containers which contain a plurality of spaced apart bottom openings or ports through which the seed is fed by gravity into a plurality of force feed units, metal hopper-like housings, which are suitably connected to the bottoms of the said bins. Each of said housings, casings or cups have a relatively large rounded side outlet discharge opening and a central aperture, and through all of such transversely aligned openings and apertures a square shaft extends which is normally rotated in one direction by the power of the traction soil-engaging disks, rollers or wheels, which said power is usually transmitted through suitable sprockets, an endless chain on said sprockets, or by co-operating gears. One of such driven gears is secured on the driven shaft which extends through the adjustable seed feeding members or units. Said driven shaft, which is usually of square shape, is journalled in suitable bearings adjacent its opposite ends to the frame parts of the implement and said shaft is longitudinally slidable in its said bearings.

Certain types of seeding implements have utilized the combination of a hand lever or handle fulcrummed on a fixed pivot on the seed box or frame plus a studded passaged shifting member journalled on the seeding shaft and secured against longitudinal movement on said shaft by pins or the like. In other words, the lever is operatively connected to the shifting member to provide for selective longitudinal movement of the rotatable seeding shaft and the feeding units thereon, a part of which shaft rotates in the round hole of the shifting member. One difficulty of such shifting clutches has been that the opposite end faces of the shifting member and the projecting parts of the pins (which absorb the thrust and assist in holding the seeding shaft and its feeding units in a set position) soon partially wear away so that a "play" or clearance results which permits undesirable uncontrolled longitudinal movement of the seeding shaft and movement of the fluted feeding units in and out of the feed cups with the result that varying amounts of seed will be fed from the feed cups according to the position to which the feed shaft shifts at frequent intervals. This results either in a waste of seed or a seeding of too much seed for the existing condition, or in a failure to deliver the desired amount of seed at the desired time.

It is an important object and accomplishment of my invention to provide an adjustable device for operatively connecting the manual seed control lever or handle of a seeder or the like with the driven seeding shaft thereof in such a manner so that wearing away of the slidably engaging parts thereof will not affect the manually controlled pre-set position of the seeding shaft and its rotating feeding units in relation to the fixed seeding cups, and in which the wearing away of parts of the manually controlled volume adjusting means will be compensated for by spring means, as hereinafter described.

A further object of my invention is the provision of a self-adjusting take-up bearing member of the class described and adapted for driven shafts where manual mechanism for varied longitudinal positioning of the shaft is provided.

Other and further important objects of my invention will be apparent from the following description and claims.

Figure 1:
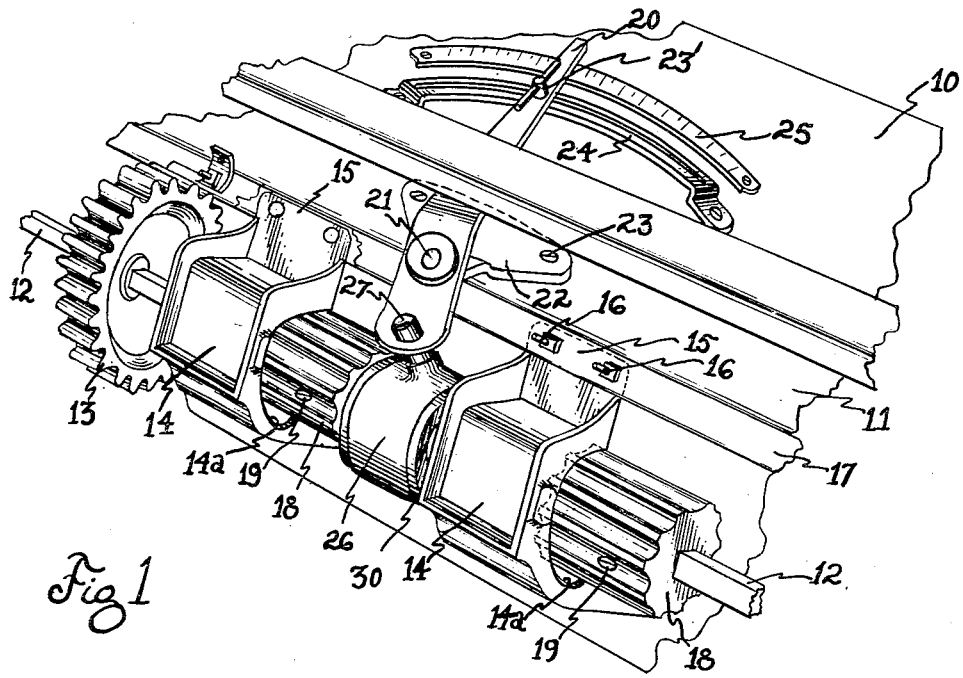
Fig. 1 is a perspective view of an intermediate portion of a seeding implement and looking at parts adjacent the bottom side of the seed box, and with certain parts broken away.

Numeral 10 designates one side wall of a seed container or box of a conventional seeder, only a fragment of which is illustrated. Numeral 11 designates the bottom of said box which is provided with a plurality of bottom outlet ports or slots (not shown), through which the seed is normally discharged. Fig. 1 is a perspective view of an intermediate fragment of such seed box and adjacent parts.

Most seeders have a laterally extending square shaft, such as shaft 12, which is journalled in suitable bearings (not shown), which bearings are in turn suitably supported on the implement frame. Said seed shaft 12 extends substantially from one end of the seed box to the other end thereof.

Said seed shaft is usually driven by a suitable chain and sprockets from the traction or disc members, and in some instances by co-operating gears which operatively connect the traction means of the implement and a driven gear such as gear 13, shown at the left of Fig. 1, and which is suitably mounted on shaft 12. A manual clutch (not shown), is usually employed in either of said forms of transmission of power from the traction elements to the gear or sprocket on the seeder shaft.

Numerals 14 designate two of a plurality of metal housings, casings or cups, which have large inlet openings (not shown), in their upper wall portions and have oppositely extending apertured integral flanges 15, as shown in the upper part of Fig. 1. Said seed cups have relatively large side outlet ports 14a through which the seed is discharged, as hereinafter described. Said cups 14 are secured in aligned position against the bottom of the seed box by a plurality of bolts 16 which extend through the respective holes in flanges 15 and through correspondingly spaced holes in a metal bar 17 and through correspondingly spaced holes in the bottom of the seed box. The said cups are positioned to align the inlet openings thereof with the holes in the bottom of the seed box. Cups 14 each have a round hole in one side wall of a size sufficient to permit shaft 12 to rotate therein.

Shaft 12, which is journalled with respect to the supporting frame, is in a position to extend centrally through the aligned cups 14. A plurality of externally fluted centrally passaged force-feed members or units 18 are mounted on shaft 12 in spaced apart positions so that said feed units 18 will be substantially completely outside the cups 14, respectively, when the seed shaft is in extreme non-feeding position (to the right in Figs. 1 and 2), and which feed units will be adjustably moved into the cups 14, respectively, according to the desired volume of seed desired to be fed and discharged through the side openings 14a of said cups. Feed units 18 are secured in desired positions on shaft 12 by threaded set screws 19, two of which are shown, and optionally by a metal washer 40 and cross pin 41, as shown in Fig. 2.

The manually adjusting and holding means for moving and pre-setting the position of said shaft 12 and feed units 18 in part comprises a manually adjustable handle or lever 20 which is fulcrumed intermediate its ends on a stud or pivot bolt 21 to the lower offset end portion of a mounting bracket 22, which bracket is secured by suitable bolts or rivets 23 to the wall 11 of seed box 10. The lower end of said lever 20 is angularly bent and apertured. The upper end of said lever 20 is adapted to be releasably secured in the desired pre-set position by a wing nut of a bolt 23' which bolt is slidably mounted in the arcuate slot of a plate 24 secured by screws to the side wall 11 of the seed box. A graduated gauge plate 25 bearing suitable indicia is secured on box side wall 10 above the plate 24. The upper end of lever or handle 20 is disposed adjacent said gauge plate.

Figure 2:
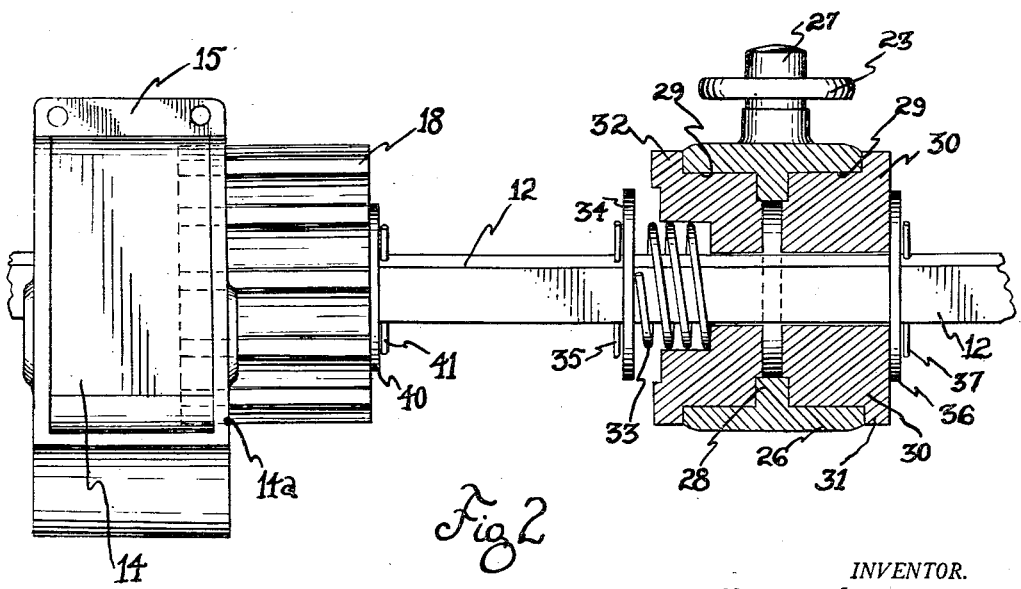
Fig. 2 is partially an elevation of a fragment of a driven shaft, a seed cup and seed feeding unit, and partially a vertical cross section of an adjustable bearing and clutch member and mechanism embodying by invention.

Referring to Fig. 2, numeral 26 designates a passaged metal casing or hub of rounded form, as indicated in Fig. 1. Hub 26 has an integral outwardly extending lug or stud 27 which extends through the hole in the lower end portion of lever 23, as shown in the drawings. Hub 26 has an integral central annual rib 28 defining a central hole through which the shaft 12 extends, and has a pair of oppositely and laterally opening annular bearing faces 29, as illustrated in cross section in Fig. 2. A metal bushing 30 having a peripheral integral annular flange 31 is removably seated in the bearing face 29 of hub 26. A second centrally recessed metal bushing 32 is removably seated in the other of bearing faces 29, as shown at the left of the right portion of Fig. 2. Said bushing 32 has an enlarged central annular recess about its central passage and providing an annular shoulder, as illustrated.

A metal expansion coil spring 33 of substantial stiffness is removably mounted in the recess bushing 32 and said spring is of a length substantially greater than the depth of said recess. A washer or collar 34 is mounted about shaft 12 and held in a position to hold said spring 33 under tension, by means of a pin 35 which is mounted in a hole extending through shaft 12, as shown in Fig. 2.

A second metal collar or washer 36 is mounted about shaft 12 and held in functional engagement with the end face of bushing 30 by a pin 37 which extends through a hole in shaft 12, as shown in Fig. 2.

It will be understood that in normal operation during which shaft 12 is rotated, the friction between washer 36 and bushing 30 and pin 37 will gradually wear away some of the metal. Also, the lengthwise uneven stresses longitudinally of the shaft, and which are partially produced by the friction between the seed and the fluted feed units 18, produce additional wearing stresses on both the washers 36 and 34 and on pins 37 and 35. The wear so produced, which otherwise would soon produce a looseness of the shifting hub in relation to the shaft 12, is taken up by my aforedescribed construction, and especially by the expansive stress of spring 33 which will cause the washers 36 and 34 to be maintained under tension and will cause the shifting hub to be maintained at a uniform position with respect to shaft 12. Thereby, the manual positioning of lever 23 and said hub and associated parts will cause a uniform unvarying pre-setting of the seed feeding units 18 in relation to the outlet openings through which they project. The extent to which the radially extending projections of feeding units 18 extend within their respective openings and into the cups controls the volume of seed normally forced through the outlet ports of cups 14 when shaft 12 and said force feed units 18 are rotated.

My invention provides a novel means described for maintaining the shifting means in a uniform position with respect to the longitudinal shiftable shaft 12, and prevents the development of "play" and consequent undesirable uneven movement of the force feed units with relation to the controlled driving shaft 12. I desire it to be understood that said construction may be also satisfactorily utilized in connection with shifting and control means for longitudinally shiftable drive shafts of machines other than seeders of the type referred to.

I am aware that numerous details of construction may be varied in a wide range without departing from the principles of my invention, and that my invention may assume various forms within the scope hereof and of the appended claims.

I claim:

1. In a mechanism for automatically maintaining a shaft shifting mechanism under tension and in proper unvarying position; a passaged hub member through which the shaft extends; said hub member having a pair of bushings mounted in the opposite ends thereof; a projecting stud on said hub member; fixed means on said shaft to prevent said hub member from longitudinal thrust in one direction; a tension spring on said shaft and engaging the outer face of one of said bushings; a thrust collar mounted on said shaft and normally engaging the opposite end of said spring; said spring being adapted to manitain said hub member in a uniform position on said shaft; and a manually operable lever having one end portion thereof engaging said stud, and releasable means for locking said lever in desired position.

2. In combination with means for controllably feeding seed from a plurality of feed cups of a seeder; a journalled driven shaft having a plurality of fluted seed feeding elements mounted thereon in positions to rotate partially within feed cups of a seed delivery means; a hub-like member having a projecting stud thereon and having a recessed passaged bushing; said driven shaft extending through said bushing; a stop pin on said shaft on one side of said member; an expansion spring in said recessed bushing and about said shaft; a thrust washer mounted on said shaft to normally press said spring against said bushing; a pin in said shaft normally engaging the outer face of said washer, and a fulcrummed lever having one apertured end engaging said stud, the movement of said lever being adapted to move said shaft longitudinally; said spring being adapted to take up the wear of bushings and said parts adjacent said hub-like member.

3. In a device for longitudinally shifting a driven shaft having means for forcibly feeding seeds or the like from cups into which such seed is discharged; a pair of spaced apart cross pins mounted in said shaft; a hub-like member mounted on said shaft between said pins; said member having annular openings on opposite sides thereof providing annular bearing surfaces; a pair of bushings mounted in said bearing surfaces of said annular openings of said hub-like member; a wear take-up spring between one of said pins and one of said bushings; a projecting stud carried by said member; a hand lever fulcrummed adjacent said member and having its end pivotally engaging said stud; and manually operable means for releasably securing said lever in desired position; said lever providing for selective longitudinal shifting and positioning of said shaft and the parts carried by said shaft.

References Cited in the file of this patent

UNITED STATES PATENTS

| | | |
|---|---|---|
| 226,355 | Rude | Apr. 6, 1880 |
| 1,712,797 | Johnston et al. | May 14, 1929 |